United States Patent [19]
Mahoney et al.

[11] Patent Number: 5,975,406
[45] Date of Patent: Nov. 2, 1999

[54] METHOD TO REPAIR VOIDS IN ALUMINUM ALLOYS

[75] Inventors: Murray W. Mahoney, Camarillo; Norman G. Taylor, Thousand Oaks; William H. Bingel; Frederick E. Long, both of Simi Valley; Robert A. Spurling, Thousand Oaks; Gerald S. Steele, Moorpark, all of Calif.

[73] Assignee: The Boeing Company, Seal Beach, Calif.

[21] Appl. No.: 09/032,094

[22] Filed: Feb. 27, 1998

[51] Int. Cl.⁶ .................................................. B23K 20/12
[52] U.S. Cl. .................... 228/112.1; 228/119; 228/222
[58] Field of Search .................. 228/112.1, 114, 228/119, 164, 203, 222, 2.1; 29/402.13, 402.16; 156/73.5

[56] References Cited

U.S. PATENT DOCUMENTS

| | | |
|---|---|---|
| 4,144,110 | 3/1979 | Luc . |
| 4,959,241 | 9/1990 | Thomas et al. . |
| 4,980,213 | 12/1990 | Obeda ........................................ 428/57 |
| 5,262,123 | 11/1993 | Thomas et al. . |
| 5,460,317 | 10/1995 | Thomas et al. . |
| 5,469,617 | 11/1995 | Thomas et al. . |
| 5,624,067 | 4/1997 | Harwig et al. . |
| 5,795,118 | 8/1998 | Osada et al. ............................ 411/171 |

FOREIGN PATENT DOCUMENTS

| | | |
|---|---|---|
| WO 93/10935 | 6/1993 | WIPO . |
| WO 95/26254 | 10/1995 | WIPO . |

OTHER PUBLICATIONS

TWI, "Leading Edge, Friction hydro pillar processing," *Connect*, Jun. 1992, advertising flyer, one page.

TWI, "On trial—a new thick plate joining technique," *Connect*, Apr. 1993, advertising flyer one page.

Andrews, R.E., et al., TWI, "Repair of Steel Structures by Friction Hydro Pillar Processing (FHPP)—Technology Development—Summary Report", Nov. 1995, 16 pages.

Thomas, W.M., et al., "Emergent Friction Joining Technologies for the Non–ferrous Casting Industry," TWI, BCIRA International Conference, 1996, pp. 30–1 through 30–12.

*Primary Examiner*—Samuel M. Heinrich
*Attorney, Agent, or Firm*—Harry B. Field

[57] ABSTRACT

The present invention provides a method to repair a void in an aluminum alloy, particularly a void resulting from an exit hole left from friction stir welding (FSW). The method includes machining the void to provide a tapered bore (34) through a parent metal, i.e., the aluminum alloy (30), providing grooves and ridges (36) on a sidewall of the tapered bore, inserting into the bore a consumable tapered plug (38) having an included angle less than, or equal to, that of the tapered bore, and rotating the plug inside the bore under an applied load to plasticize both its surface and the ridges on the parent metal tapered bore. The tapered plug is preferably attached at its proximal end to a nonconsumable heat sink (40) to remove excessive heat generated during rotation of the plug. Also, a support bracket is temporarily attached to the aluminum alloy adjacent the tapered bore to receive a distal end of the plug (38) and to react to the applied load. The plasticized material (48) at the interface between the plug and the tapered bore, upon hardening, produces a strong bond consisting of refined and recrystallized fine metal. The heat sink and the support bracket can be later trimmed away.

16 Claims, 6 Drawing Sheets

METHOD TO REPAIR VOIDS IN ALUMINUM ALLOYS

FIELD OF THE INVENTION

This invention relates to a method for repairing voids in an aluminum alloy or a weld, and more particularly to a method for filling exit holes left from friction stir welding of aluminum alloys.

BACKGROUND OF THE INVENTION

Friction stir welding (FSW) is a relatively new welding process for joining parts of materials such as metals, plastics, and other materials that will soften and commingle under applied frictional heat to become integrally connected. A detailed description of an FSW apparatus and process may be found in Patent Publications WO 93/10935 and WO 95/26254; and U.S. Pat. No. 5,460,317, all of which are herein fully incorporated by reference. One useful apparatus for FSW is shown in FIGS. 1A and 1B and includes a shoulder 14' at its distal end, and a nonconsumable welding pin 16' extending downward centrally from the shoulder. As shown, two parts to be welded together, exemplified by plates 10A' and 10B' on backing plate 12', are aligned so that edges of the plates along the weld joint are in direct contact. As the rotating tool W' is brought into contact with the weld interface between plates 10A' and 10B', the rotating pin 16' is forced into contact with the material of both plates, as shown. The rotation of the pin in the material and rubbing of the shoulder against the upper surface of the material produce a large amount of frictional heating of both the welding tool and the plate interface. This heat softens the material of the plates in the vicinity of the rotating pin and shoulder, and in concert with deformation created by the rotating pin, causes commingling of material, which, upon hardening, forms a weld. The tool is moved longitudinally along the interface between plates 10A' and 10B', thereby forming an elongate weld along the interface between the plates. When the weld is completed, the welding tool is retracted.

FSW has been successfully used for welding aluminum alloys. For welding together flat workpieces, suitable run-on and run-off extensions can be utilized. These extensions, or end-tabs, provide starting and stopping points along a weld seam that may be later trimmed away. The end-tabs serve to transition a FSW tool to and from the workpieces without causing undue disturbance to the weld. A problem arises when welding workpieces that cannot have end-tabs, for example, workpieces with a circumferential geometry such as domes and cylinders, or workpieces with any continuous curved surface. In these situations, the FSW tool must be retracted from the weld at one point. The retraction leaves an exit hole behind on the weld, which remains unfilled and creates a discontinuity in the weld path.

To repair holes in steel, friction hydro pillar processing (FHPP) has been developed. FIG. 2 is a schematic diagram of a prior art FHPP for steel. The process involves rotating a consumable rod 20 coaxially in a generally cylindrical hole 22 to be filled, while under an applied load to generate continuously a plasticized layer 24. The rotating rod 20 heats with friction to generate plasticized layer 24 in an almost hydrostatic condition. Plasticized layer 24 develops at a rate faster than the feed rate of rod 20, causing plasticized layer 24 to rise along hole 22 while leaving beneath a dynamically recrystallized deposit material 26. FHPP, which was developed specifically for steel, however, is not directly applicable to aluminum alloys due to aluminum's reduced high-temperature strength and high oxidation rate behavior. Specifically, while a certain amount of heat is necessary to cause softening of aluminum to fill a void, excessive frictional heat generated during FHPP tends to degrade the structural and metallurgical properties of aluminum alloys. A need exists to provide a method for repairing voids in aluminum alloys, in particular, filling exit holes left from FSW process, with material the same as, or similar in composition to, the parent material in such a manner that the repaired section has structural and metallurgical properties that are the same as, or better than, the parent metal.

SUMMARY OF THE INVENTION

The present invention provides a method to repair a void in an aluminum alloy, particularly a void resulting from an exit hole left from friction stir welding (FSW). The method includes machining the void to provide a tapered bore through a parent material, i.e., the aluminum alloy. In accordance with the present invention, grooves and ridges are provided on a sidewall of the tapered bore. A consumable tapered plug having an included angle less than, or equal to, that of the tapered bore is fitted to the bore, preferably with the tip of the plug extending beyond the bore depth. The tapered plug is preferably attached at its proximal end to a larger nonconsumable section that serves as a heat sink. The heat sink serves to remove excessive heat generated during rotation of the plug. Alternatively, external cooling, such as a cooling fluid, can be employed to remove excess heat. A support bracket is temporarily attached to the aluminum alloy adjacent the tapered bore. The support bracket includes a cavity that is machined so that the tip of the plug is fitted to the cavity. As the consumable tapered plug is rotated inside the tapered bore under an applied load, the plug and the parent material in proximity to their interface become plasticized and commingled to form a bonding interface, due to the normal component of the applied load, frictional heat, and hydrodynamic force. The ridges on the surface of the tapered bore are crushed and plasticized by the plug material to further enhance local deformation and commingling of the plug material and the parent material. Upon hardening of the plasticized material at the interface, the heat sink and the support bracket can be trimmed away, leaving the tapered bore thoroughly bonded with the plug material at the interface consisting of refined and recrystallized fine metal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The invention provides a method for repairing a void in an aluminum alloy, particularly a void resulting from an exit hole left when a friction stir welding (FSW) tool is removed from the workpieces at the conclusion of an FSW process. The method achieves this goal by inserting a consumable plug into a bore that has been machined into the aluminum alloy to subsume the void, and rotating the plug inside the bore under an applied load to plasticize and commingle the edge of the plug material and the adjacent parent material.

The following description describes the present invention in the context of repairing a void that results when a FSW tool is removed from workpieces that are to be welded together. It should be understood that the methods of the present invention are equally applicable to voids that may be present in aluminum alloy workpieces that do not necessarily result from an exit hole in a FSW weld.

Figure 1A:
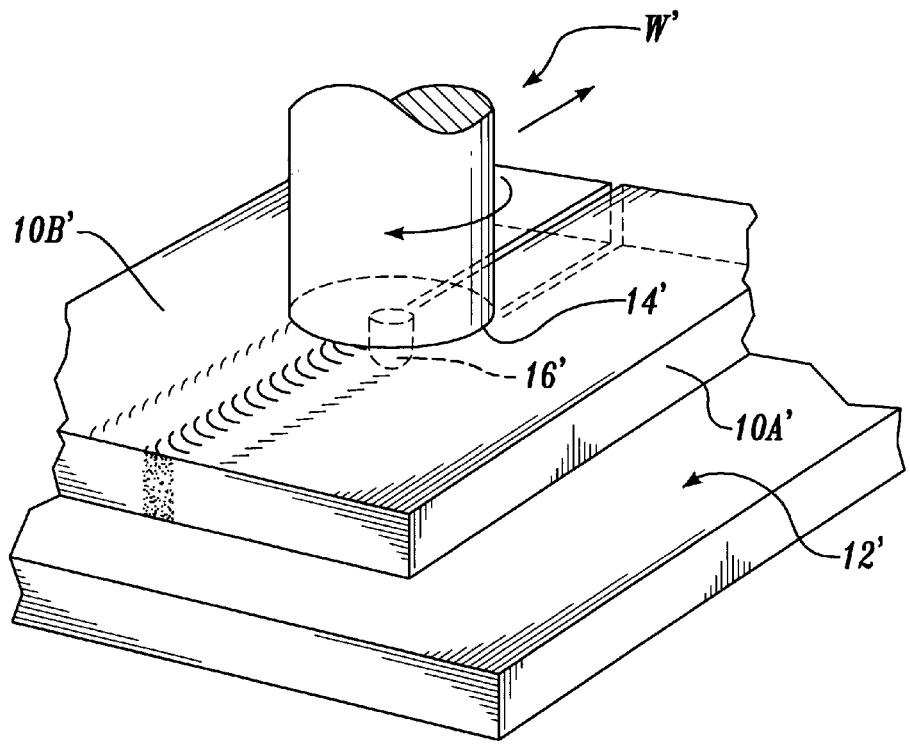
FIG. 1A is a schematic diagram of a prior art friction stir welding tool.
Figure 1B:
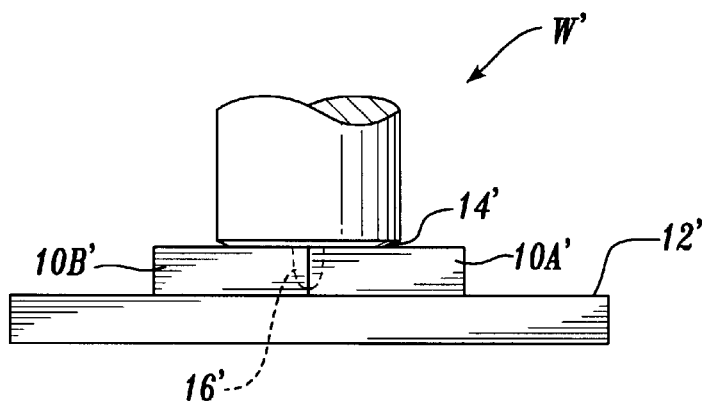
FIG. 1B is a schematic end view showing a prior art friction stir welding tool in use.
Figure 2:
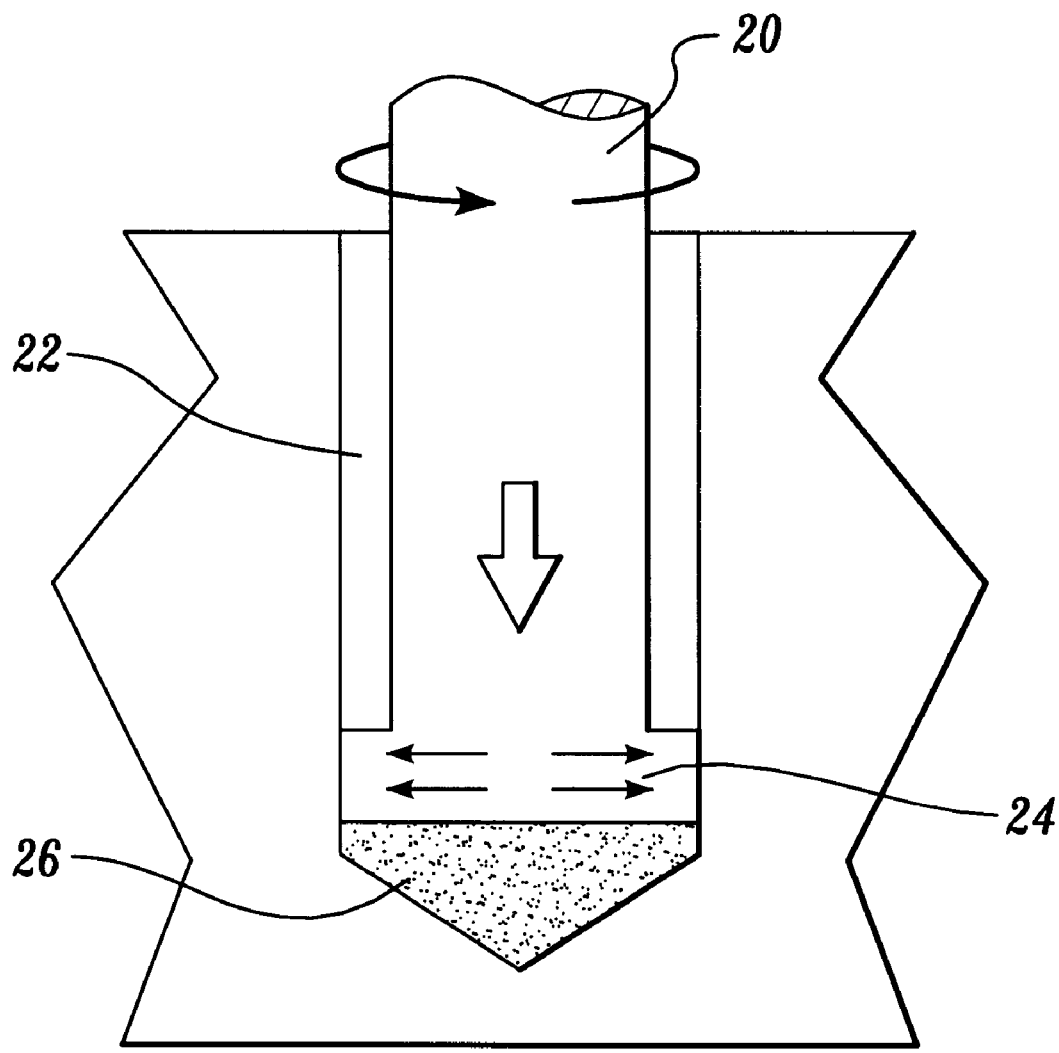
FIG. 2 is a schematic diagram illustrating a prior art friction hydro pillar process (FHPP)
Figure 3A:
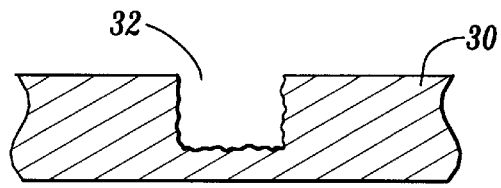
FIGS. 3A through 3E schematically illustrate setup procedures of the present invention according to a preferred embodiment.
Figure 3B:
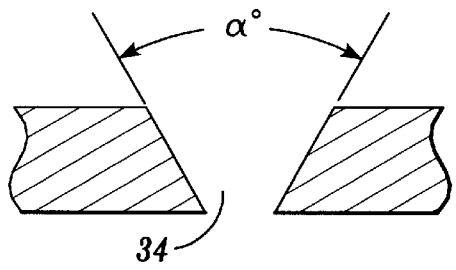
Figure 3C:
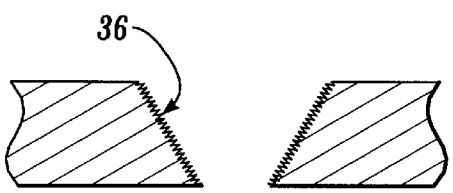
Figure 3D:
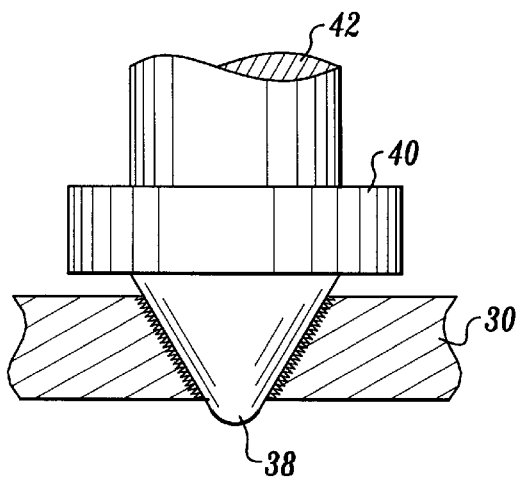
Figure 3E:
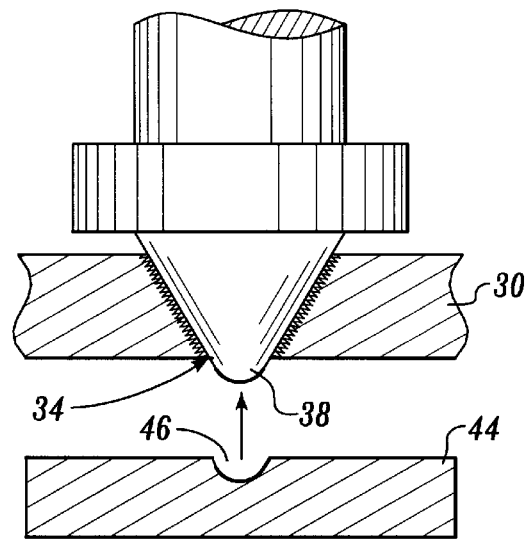

FIGS. 3A through 3E illustrate preferred setup procedures for repairing a void in an aluminum alloy FSW weld according to the present invention. FIG. 3A illustrates an aluminum workpiece 30 with an anomaly void 32. Anomaly void 32 can be an exit hole left from the friction stir welding process or it can be a void resulting from the production or machining of the aluminum alloy workpiece. Void 32 is machined to provide a tapered bore 34 as illustrated in FIG. 3B. Tapered bore 34 has an included angle α, which is dependent on the flow properties of both the parent material and the consumable plug material. For example, a low flow-stress material such as pure aluminum will require a dimension different from what is desirable for a high-strength alloy such as 7075 T6 aluminum. In the illustrated embodiment, α is about 60°. Referring to FIG. 3C, grooves and ridges 36 are provided on the surface of tapered bore 34. As before, the dimensions of small ridges 36 are dependent on the flow stress of the parent material and the consumable plug material. In one embodiment, 72 ridges per inch was satisfactory. Into thus grooved tapered bore 34, a consumable tapered plug 38 having an included angle less than or equal to that of tapered bore 34 is inserted, as in FIG. 3D. Preferably, the tip of consumable tapered plug 38 extends beyond a rear surface of aluminum workpiece 30. Further, consumable tapered plug 38 is preferably attached at its proximal end opposite its tip to a nonconsumable larger section 40. Larger section 40 has a proximal end 42 that is operatively connected to a motor, not shown in the FIGURE, for rotating larger section 40 and, thus, consumable tapered plug 38. Referring to FIG. 3E, preferably, a support bracket 44 is temporarily attached to aluminum workpiece 30 adjoining consumable tapered plug 38. Support bracket 44 includes a cavity 46 machined to receive the tip of consumable tapered plug 38. Support bracket 44 is provided to react to a load applied to tapered plug 38 at its proximal end and to prevent plasticized plug and parent material from deforming, i.e., other than locally at the faying interface.

Figure 4A:
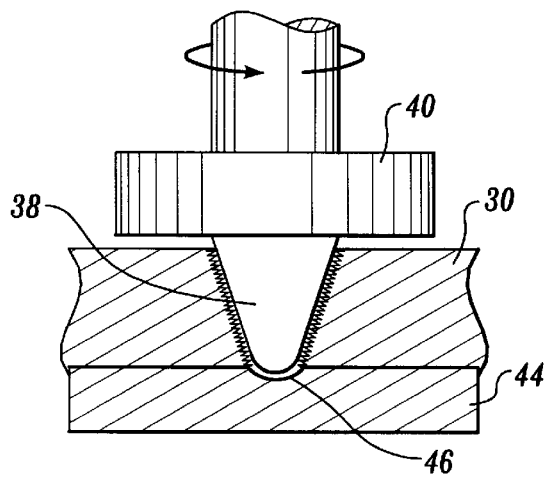
FIGS. 4A through 4D schematically illustrate procedures of the present invention following the setup procedures illustrated in FIGS. 3A–3E, according to a preferred embodiment.
Figure 4B:
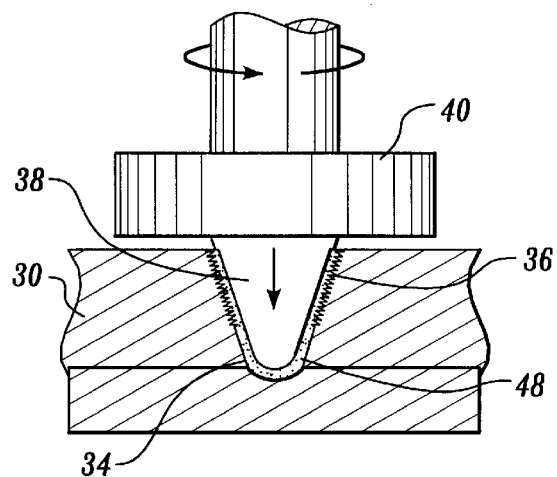

FIGS. 4A through 4D illustrate procedures which follow the setup procedures hereinabove described with respect to FIGS. 3A–3E according to a preferred embodiment of the present invention. FIG. 4A schematically illustrates consumable tapered plug 38 attached at its proximal end to nonconsumable larger section 40, inside the tapered and grooved bore in aluminum workpiece 30, with its tip received by cavity 46 of support bracket 44. As larger section 40 is rotated by a motor with which it is operatively connected, consumable tapered plug 38 rotates while contained inside the tapered and grooved bore and cavity 46. Referring now to FIG. 4B, as tapered plug 38 rotates under an applied load, the plug material and the parent material of the aluminum workpiece in proximity to their interface become plasticized and commingled with each other, becoming generally plasticized material 48. The plasticization of these materials is due to the normal component of the applied load, frictional heat generated by the plug rotation, and hydrodynamic force.

The included angle α of tapered bore 34 previously discussed with respect to FIG. 3B is chosen to produce a normal load component sufficient to generate plasticized material 48. In addition, the included angle of tapered plug 38 is preferably slightly less than that of tapered bore 34 in order to ease rotation of tapered plug 38, and also not to trap air between tapered plug 38 and tapered bore 34 or between ridges 36. When air is trapped inside plasticized material 48, it tends to degrade the metallurgical and structural properties of plasticized material 48 as it becomes recrystallized. Ridges 36 provided on the surface of tapered bore 34 are crushed by the plug material to further enhance local deformation of the plug material and the surrounding parent material. The size of ridges 36 is chosen so that the ridges are coarse enough to be crushed by the plug material and at the same time fine enough to be completely consumed in plasticized material 48 during the repairing operation according to the present invention.

Still referring to FIG. 4B, rotation of tapered plug 38 is continued until the entire interface between tapered plug 38 and tapered grooved bore 34 in aluminum workpiece 30 becomes plasticized and commingled material 48 and until ridges 36 are completely consumed in plasticized material 48.

During the repairing operation, larger section 40 serves as a heat sink to remove excessive heat generated by constant rotation and rubbing of tapered plug 38 against the tapered and grooved bore in aluminum workpiece 30. In the illustrated embodiment, heat sink 40 is illustrated as a flat, cylindrical disk. It is to be understood that heat sink 40 can take other forms and still serve effectively as a heat sink. Furthermore, it should be understood that, while the provision of a heat sink is preferred, the advantages of the present invention as they relate to the provision of the ridges on the tapered surface of the bore in aluminum workpiece 30 can be achieved by controlling the temperature of the consumable plug and the plasticized material by other cooling means. For example, cooling fluids could be employed to remove excessive heat from the tapered plug.

Figure 4C:
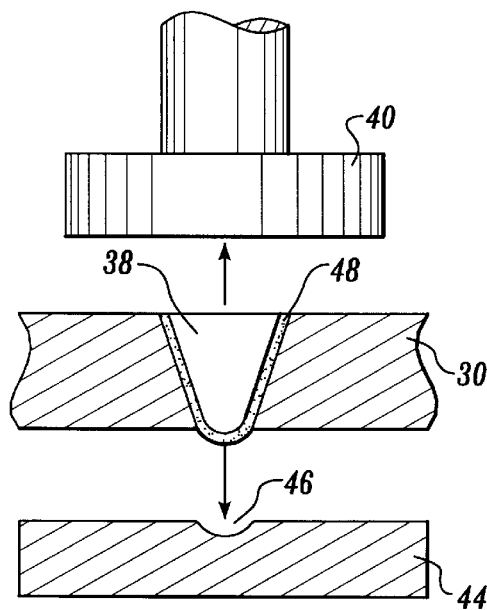
Figure 4D:
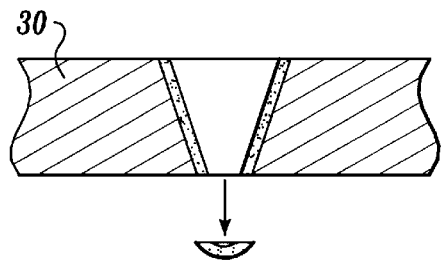

Referring to FIG. 4C, upon completion of bonding the interface between the tapered bore in workpiece 30 and tapered plug 38 and hardening of plasticized material 48 at the interface, heat sink 40 and support bracket 44 are trimmed away. The hardened plasticized material 48 has a tip extending beyond the rear surface of aluminum workpiece 30. As illustrated in FIG. 4D, the tip may be trimmed away to provide a smooth rear surface on aluminum workpiece 30.

Figure 5A:
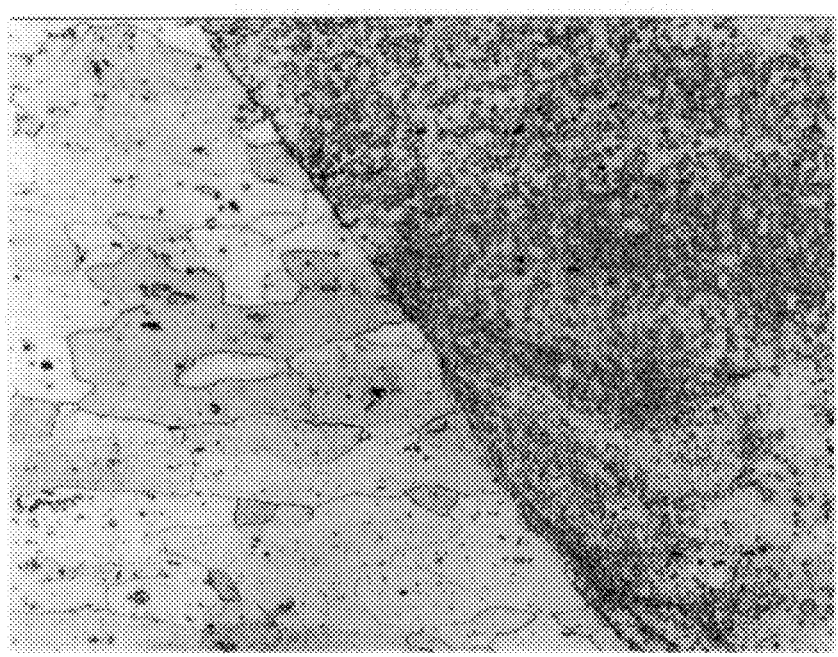
FIG. 5A is an optical micrograph showing a cross-sectional detailed view of a void filled using a prior art method.
Figure 5B:
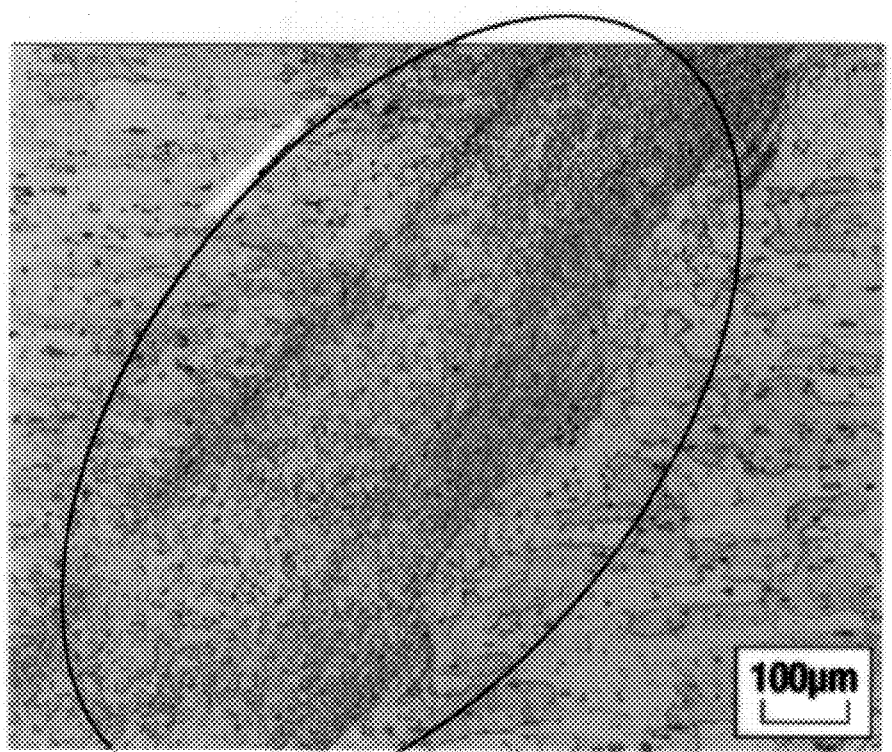
FIG. 5B is an optical micrograph showing a cross-sectional detailed view of a void filled in accordance with the invention.

In accordance with the invention, a void in an aluminum alloy is filled, producing a filled section having structural and metallurgical properties that are the same as or better than those of the parent metal. FIG. 5A, an optical micrograph of a repaired exit hole in an aluminum alloy 2219 at magnification of two hundred times, illustrates how a void filled according to a prior art procedure produces a poor bond at the interface between a plug material (finer grain) shown in the right and a parent material (larger grain) shown in the left. The interface shows no integration of consumable plug and parent metal. In the repaired exit hole of FIG. 5A, a consumable plug was fitted to a tapered void having no ridges, and was rotated without using a heat sink to control excessive heat. In contrast, referring to FIG. 5B, which is an optical micrograph at the same magnification and of the same material as FIG. 5A, a void filled in accordance with the invention has a refined and recrystallized region 50 (finer grain) forming a strong bond at the interface between plug material shown in the left and parent material shown in the right. The solid bond shown in FIG. 5B was produced using a tapered and grooved void and a consumable tapered plug attached at its proximal end to a heat sink, according to a preferred embodiment of the present invention.

Figure 6:
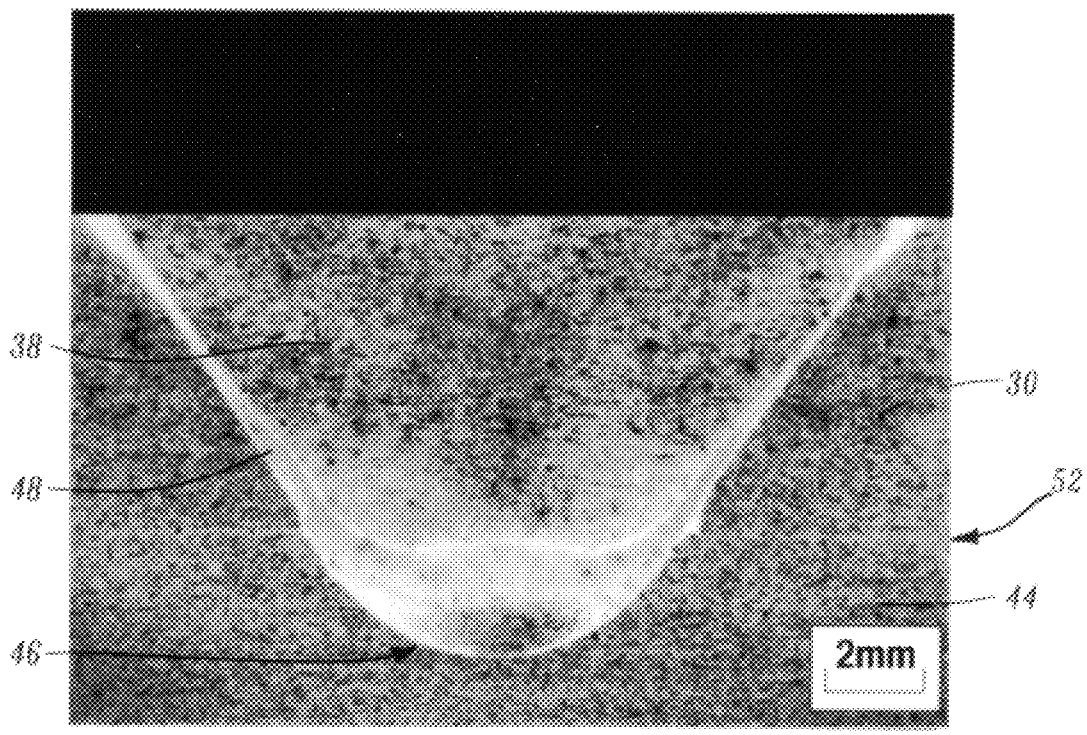
FIG. 6 is an optical micrograph showing an overall cross-sectional detailed view of a void filled in accordance with a preferred embodiment of the present invention.

FIG. 6 illustrates a typical product of a method to repair an aluminum void according to the present invention. The FIGURE shows a tapered bore in aluminum workpiece 30 filled with consumable tapered plug 38 and hardened plasticized material 48. The aluminum workpiece 30 is supported at its rear surface 52 by support bracket 44 having cavity 46, which contains a tip portion of plasticized material 48.

Though not apparent from FIG. 6, relatively poor bonding is formed at an interface between the tip portion of plasticized material 48 and the cavity surface. This region at a plug tip was subject to less rubbing against the parent metal as compared to the tapered and grooved interface region, and thus was not as much plasticized and commingled with the parent metal. Thus, to form optimal bonding, it is preferable to form a throughbore in an aluminum workpiece and insert a consumable tapered plug extending beyond the workpiece depth. In this way, a relatively poor bonding portion formed at the tip of a plug can be later easily trimmed away. In situations where an optimal quality bonding is not required, however, the repair method of the present invention can be used with a non-throughbore and without a support bracket.

Accordingly, the present invention provides a novel method for filling an exit hole left from friction stir welding an aluminum alloy. Clearly, the same method can be easily applied to repairing other anomalies found in an aluminum alloy, such as fatigue cracks and rivet cracks.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method to repair a void in an aluminum alloy, the method comprising:
    (a) machining the aluminum alloy to provide a tapered bore through the aluminum alloy that subsumes the void and has an acute included angle;
    (b) providing ridges on a sidewall of the tapered bore;
    (c) inserting into the tapered bore a tapered plug having an included angle less than or equal to that of the bore; and
    (d) rotating the plug under an applied load to plasticize both its surface and the ridges on the parent metal tapered bore.

2. The method of claim 1, wherein the void is in a friction stir weld.

3. The method of claim 2, wherein the void is an exit hole left from friction stir welding.

4. The method of claim 1, wherein the tapered plug has an included angle less than or equal to that of the tapered bore.

5. The method of claim 1, wherein, after being inserted in the tapered bore, a tip of the tapered plug extends through and beyond the aluminum alloy.

6. The method of claim 5, further comprising the step of providing a support bracket adjacent the tapered bore to receive the tip of the tapered plug.

7. The method of claim 1, wherein the tapered plug includes a proximal end that is attached to a heat sink.

8. The method of claim 7, further comprising the step of providing a heat sink adjacent a proximal end of the tapered plug.

9. The method of claim 1, further comprising a means for controlling the temperature of the plug and the plasticized material.

10. A method to repair a void in an aluminum alloy, the method comprising:
    (a) machining the aluminum alloy to provide a tapered bore, not completely through the aluminum alloy, that subsumes the void and has an acute included angle;
    (b) providing ridges on a sidewall of the tapered bore;
    (c) inserting into the tapered bore a tapered plug having an included angle less than or equal to that of the bore; and
    (d) rotating the plug under an applied load to plasticize both its surface and the ridges on the parent metal tapered bore.

11. The method of claim 10, wherein the void is in a friction stir weld.

12. The method of claim 11, wherein the void is an exit hole left from friction stir welding.

13. The method of claim 10, wherein the tapered plug has an included angle less than or equal to that of the tapered bore.

14. The method of claim 10, wherein the tapered plug includes a proximal end that is attached to a heat sink.

15. The method of claim 14, further comprising the step of providing a heat sink adjacent a proximal end of the tapered plug.

16. The method of claim 10, further comprising a means for controlling the temperature of the plug and the plasticized material.

* * * * *